United States Patent Office 3,041,378
Patented June 26, 1962

3,041,378
PURIFICATION OF ISOPHORONE
Ernest Cecil Craven, Hedon, and Maurice William Fewlass, Hull, England, assignors to The Distillers Company Limited, Edinburgh, Scotland, a British company
No Drawing. Filed Nov. 10, 1958, Ser. No. 772,673
Claims priority, application Great Britain Nov. 21, 1957
5 Claims. (Cl. 260—586)

The present invention relates to the purification of isophorone.

It is known that isophorone may be prepared from acetone, for example by heating it at a superatmospheric pressure in the presence of an alkaline catalyst such as sodium hydroxide. The crude isophorone produced, which may contain about 80% by weight of isophorone together with water, may, however, have an undesirable, strong yellow colour.

According to the present invention, the process of decolorizing crude isophorone comprises contacting the isophorone with an acid type of fuller's earth at an elevated temperature and recovering isophorone by distillation.

An acid type of fuller's earth is used in the invention. By this term is meant a type of fuller's earth which, if 2 parts by weight of the fuller's earth were suspended in 100 parts by weight of distilled water, would impart to the water a pH value below 7.0. Preferably the type of fuller's earth used is one which would in this way impart to the water a pH value not greater than 4.0.

The isophorone is contacted with the fuller's earth at an elevated temperature. Preferably the temperature is within the range from 90° to 150° C.

The process of the invention may be carried out in any of several ways. The fuller's earth may, for instance, be suspended in the crude isophorone, the resulting mixture being boiled under reflux conditions and isophorone being recovered by distillation. In another embodiment of the invention, the crude isophorone is allowed to percolate through the fuller's earth. A column may, for example, be packed with the fuller's earth and the isophorone passed through the column; the column is maintained at an elevated temperature and may conveniently be surrounded by an external heating jacket, such as a jacket through which steam can be passed.

The crude isophorone decolorized by the process of the invention may be the final product prepared from acetone consisting of isophorone but having an undesirable, strong yellow colour; alternatively a less pure sample of isophorone may be used, for example a sample containing about 80% by weight of isophorone. The decolorization may be arranged to take place independently of or in conjunction with other purification of the isophorone. The decolorization may, for instance, be carried out without substantially increasing the purity of the product, the colouring material being only present in a trace quantity; on the other hand, the decolorization may be carried out in conjunction with another purification procedure if desired, so that the isophorone is not only decolorized but a product having a substantially increased purity is obtained.

While the decolorization of the isophorone according to the invention may be carried out virtually to completion, so that a substantially colourless product is obtained, the process may be operated if desired so that the isophorone is only partly decolorized.

The isophorone is recovered by distillation. The distillation may be carried out using any suitable type of distillation column; preferably the distillation is carried out with fractionation. The isophorone is preferably separated from the fuller's earth before the distillation is commenced.

The process of the invention may be carried out batchwise. It may also be carried out in a partly continuous manner, for example by arranging either a continuous flow of isophorone through a bed of fuller's earth or a continuous distillation of the treated isophorone; the process may be operated in a continuous manner, for example, by arranging both a continuous flow of isophorone through the bed of fuller's earth and a continuous distillation of the treated isophorone. If desired, the stages in the invention of treating the isophorone with fuller's earth and the distillation of the treated isophorone may be combined into a distillation of the isophorone in the presence of the fuller's earth.

Isophorone is a known substance having useful solvent properties; it is, for example, used as a solvent in the production of printing inks.

The following examples are given to illustrate further the process of the invention. Parts by weight shown therein bear the same relation to parts by volume as do kilograms to litres. The colour of the isophorone was measured in the Lovibond tintometer using a 1 inch cell.

*Example 1*

Dry isophorone having a yellow colour of 3.4 units was charged to the kettle of a distillation column together with 1% weight per volume of a commercially obtainable grade of fuller's earth in granulated form having a 10–30 mesh (Grade P.A. 10/30 from The Fuller's Earth Union Limited, Redhill, Surrey, England). If 2 parts by weight of this fuller's earth were suspended in 100 parts by weight of distilled water, the fuller's earth would impart a pH value of 3.9 to the water.

The mixture was boiled under reflux for an hour at a pressure of 15 millimetres mercury and was then fractionated. After a small separate first fraction had been collected, the following fractions were collected and the colour of each was determined.

| Fraction No. | Fraction volume [1] | Colour (units) |
|---|---|---|
| 1 | 20 | 0.7 |
| 2 | 26 | 0.3 |
| 3 | 19 | 0.2 |
| 4 | 19 | 0.2 |

[1] Percentage by volume of the fraction based on the change of isophorone.

*Example 2*

200 parts by volume of dry isophorone having a yellow colour of 3.4 units, together with 5 parts by weight of the same type of fuller's earth as used in the process described in Example 1, were charged to the kettle of a distillation column.

The distillation was then started and further quantities of isophorone were fed in as the distillation continued. The colour of the distillate was measured and is given in the following table; the feed rate of the isophorone is given in parts by volume per hour and the distillate volume is given in parts by volume.

| Feed rate | Distillate volume | Yellow colour (units) |
|---|---|---|
| 50 | 50 | 0.7 |
| 50 | 100 | 0.7 |
| 50 | 100 | 0.3 |
| 100 | 100 | 0.4 |
| 100 | 100 | 0.4 |
| 120 | 100 | 0.4 |
| 120 | 100 | 0.4 |

Example 3

A vertical glass column provided with a jacket was packed with fuller's earth; the fuller's earth was the same type as that used in the processes described in the previous examples. Steam at a temperature of 100° C. and at atmospheric pressure was passed through the jacket and isophorone was fed into the top of the column at a rate of 100 parts by volume per hour, so as to allow a residence time in contact with the fuller's earth of about 40 minutes.

The treated isophorone was then distilled continuously as it emerged from the base of the column. The colour of the distillate was found to be 0.1 unit yellow.

Example 4

Wet, crude samples containing about 80% by weight of isophorone were percolated through a heated column packed with fuller's earth as described in Example 3. The treated samples were then distilled batchwise and the colours of the distillates were measured. The results are given in the following table. The three samples of crude isophorone so decolorized were found also to have been increased in purity to 95 to 96% by weight.

In contrast with the process of the present invention, the procedure described in Example 4 was repeated using a sample of the same wet, crude isophorone without treating it with fuller's earth. This result is also given in the following table.

| Sample No. | Residence time over fuller's earth (minutes) | Colour of distilled isophorone (units) |
|---|---|---|
| 1 | 30 | 1.0 |
| 2 | 40 | 0.7 |
| 3 | 50 | 0.5 |
|   | untreated | 5.2 |

Example 5

A vertical column was packed with 40 parts by volume of a commercially obtainable grade of fuller's earth in granulated form having a 16–30 mesh (the K10 product of the Garthwood Company). If 2 parts by weight of this fuller's earth were suspended in 100 parts by weight of distilled water, the fuller's earth would impart a pH value of 4.0 to the water. The column was heated by an external jacket through which was passed the vapour of boiling secondary butyl alcohol (boiling point 99° C.).

Wet crude isophorone having a purity of 80% by weight was fed into the top of the column at the rate of 40 parts by volume per hour, so allowing a residence time in contact with the fuller's earth in the percolation column of one hour.

The percolate was collected and was distilled batchwise. Isophorone was obtained having a yellow colour of only 0.2 to 0.3 units. The purity in respect of the isophorone content was substantially unaltered.

Example 6

The procedure described in Example 5 was repeated using a percolation column packed with a commercially obtainable, highly acidic grade of fuller's earth which would, if 2 parts by weight of the fuller's earth were suspended in 100 parts by weight of distilled water, impart a pH value of 2.75 to the water; the same type of isophorone was fed into the column at the rate of 40 parts by volume per hour and a product of isophorone was obtained which had a yellow colour of 0.2 to 0.3 units. The purity in respect of the isophorone content was substantially unaltered.

As a contrast with the process of the present invention, the procedure described in Example 6 was carried out except that the isophorone was not treated with the fuller's earth. The isophorone obtained had a colour of 3.3 units and the purity in respect of the iosphorone content was substantially unaltered.

Example 7

400 parts by volume of a sample of wet crude isophorone containing about 80% by weight of isophorone was stirred for 1 hour at 100° C. with 5 parts by weight of an acid type of fuller's earth which is commercially available (Grade M.Q.C. from The Fuller's Earth Union Limited, Redhill, Surrey, England), and if 2 parts by weight of the fuller's earth were suspended in 100 parts by weight of distilled water, would impart a pH value of 2.9 to the water.

Isophorone was then distilled from the mixture at a pressure of 15 millimetres of mercury. In the following table are given the volumes of the fractions collected, in parts by volume, and also the colour. As a comparison with the present invention, the process was repeated using the same sample of crude isophorone but omitting the treatment with fuller's earth; the fractions collected and the colour are also given in the table.

| With fuller's earth M.Q.C. | | | Without fuller's earth | | |
|---|---|---|---|---|---|
| Fraction No. | Volume of fraction (parts by volume) | Colour (units yellow) | Fraction No. | Volume of fraction (parts by volume) | Colour (units yellow) |
| 1 | 98 | 0.9 | 1 | 90 | 2.1 |
| 2 | 120 | 0.8 | 2 | 70 | 2.0 |
| 3 | 75 | 1.0 | 3 | 85 | 2.3 |
|   |    |     | 4 | 68 | 3.2 |

As a further comparison with the present invention, the process described in Example 7 was repeated using the same sample of crude isophorone but using two alkaline types of fuller's earth. The results are given in the following table. "Fulbent 182" and "Fulbent 570" are two types of fuller's earth which are commercially available from The Fuller's Earth Union Limited, Redhill, Surrey, England, and each of which, if 2 parts by weight of the fuller's earth were suspended in 100 parts by weight of distilled water, would impart a pH value of 10.0 to the water.

| "Fulbent 182" | | | "Fulbent 570" | | |
|---|---|---|---|---|---|
| Fraction No. | Fraction volume (parts by volume) | Colour (units yellow) | Fraction No. | Fraction volume (parts by volume) | Colour (units yellow) |
| 1 | 75 | 1.4 | 1 | 90 | 1.5 |
| 2 | 100 | 1.6 | 2 | 85 | 2.2 |
| 3 | 70 | 2.2 | 3 | 65 | 2.0 |
| 4 | 45 | 3.0 | 4 | 30 | 3.7 |

We claim:

1. A process of decolorizing crude isophorone comprising contacting the isophorone with an acid type of fuller's earth at a temperature in the range from 90° to 150° C. and distilling to recover isophorone.

2. The process claimed in claim 1 wherein the fuller's earth is suspended in the crude isophorone and isophorone is recovered by distilling the resulting mixture.

3. The process claimed in claim 1 wherein the fuller's earth has the form of a columnar zone and wherein the contacting of the isophorone with the fuller's earth is effected by passing the isophorone through said columnar zone.

4. A process of decolorizing crude isophorone comprising heating to a temperature in the range from 90° to 150° C. the isophorone with fuller's earth, 2 parts by weight of which suspended in 100 parts by weight of distilled water imparts to the water a pH value below 7.0, and distilling to recover isophorone.

5. A process of decolorizing crude isophorone comprising heating to a temperature in the range from 90° to 150° C. the isophorone with fuller's earth, 2 parts by weight of which suspended in 100 parts by weight of distilled water imparts to the water a pH value below 4.0, and distilling to recover isophorone.

References Cited in the file of this patent

UNITED STATES PATENTS

| | | |
|---|---|---|
| 233,453 | Winter | Oct. 19, 1880 |
| 1,909,605 | Belden | May 16, 1933 |
| 2,148,103 | Bruson | Feb. 21, 1939 |

OTHER REFERENCES

Mantell: Adsorption (2nd ed.), pages 44–69; (pages 44–48, 51, 66–69 relied upon), 1951. (Copy in Sci. Lib.)